United States Patent [19]
Watanabe et al.

[11] Patent Number: 5,172,932
[45] Date of Patent: Dec. 22, 1992

[54] AIR BAG DEVICE

[75] Inventors: Kazuo Watanabe; Takayasu Zushi, both of Shiga, Japan

[73] Assignee: Takata Corporation, Tokyo, Japan

[21] Appl. No.: 683,617

[22] Filed: Apr. 11, 1991

[30] Foreign Application Priority Data

May 24, 1990 [JP] Japan .................. 2-134681

[51] Int. Cl.⁵ .............................................. B60R 21/16
[52] U.S. Cl. ..................................... 280/731; 280/743
[58] Field of Search ............... 280/728, 730, 731, 732, 280/743

[56] References Cited

U.S. PATENT DOCUMENTS

| | | | |
|---|---|---|---|
| 4,334,699 | 6/1982 | Patzelt et al. | 280/731 |
| 4,852,907 | 8/1989 | Shiraki et al. | 280/731 |
| 4,915,410 | 4/1990 | Bachelder | 280/732 |
| 4,991,869 | 2/1991 | Hopf et al. | 280/731 |

FOREIGN PATENT DOCUMENTS

| | | |
|---|---|---|
| 0397154 | 10/1989 | European Pat. Off. |
| 8904999 | 1/1989 | Fed. Rep. of Germany |
| 8915085 | 12/1989 | Fed. Rep. of Germany |
| 2210338 | 9/1987 | United Kingdom |
| 2239434 | 12/1989 | United Kingdom |

Primary Examiner—D. Glenn Dayoan
Assistant Examiner—Kenneth Noland
Attorney, Agent, or Firm—Kanesaka and Takeuchi

[57] ABSTRACT

An air bag device, in which an air bag is attached to a retainer and is covered with a lid-like module cover having a portion near its edge, this portion being attached to the retainer. The portion near the edge of the module cover has a rigidity larger than that of the other portion, and the module cover has a bending region in a tearing operation, which is located near a boundary between the high rigidity portion and a low rigidity portion.

7 Claims, 2 Drawing Sheets

AIR BAG DEVICE

FIELD OF THE INVENTION AND RELATED ART STATEMENT

The present invention relates to an air bag device adapted to develop at a crash of a vehicle for protecting an occupant.

In an air bag device, a folded air bag is attached to a mounting plate called as a "retainer", and is covered with a module cover. The module cover is similarly attached to the retainer, and is provided with a tear line (weak linear portion) at which tearing starts when the air bag develops.

Further, an inflator is attached directly or through an appropriate mounting member to the retainer. The inflator is adapted to discharge a gas for rapidly developing the air bag at the crash of the vehicle.

Such an air bag in the prior art will be described below with reference to FIGS. 2 and 3.

In FIG. 2, a retainer 10 has a flat plate portion 14 to which an air bag 12 is attached, and a module cover mounting which is formed of an erected piece 16 projected oppositely to an occupant from an edge of the flat plate portion 14. The air bag 12 is in a folded condition and is covered with a module cover 18. The module cover 18 has a proximal portion near its edge, which is fixed to the above erected piece 16 by rivets 20. A numeral 21 indicates a reinforcing piece. A numeral 22 indicates an inflator, which has an upper portion projected through an opening 24 formed in the flat plate portion 14 into the air bag 2, and is fixed to the retainer 10. A numeral 26 indicates an air bag mounting member called as a ring, which cooperates with an edge of the opening 24 in the flat plate portion 14 to pinch an open edge of the air bag 12, so as to fix the air bag 12 to the retainer 10. A numeral 28 indicates a tear line provided in the above module cover 18.

In the air bag device thus constructed, when the inflator 22 is activated due to the crash or the like of the vehicle, a large amount of gas is rapidly injected from the inflator 22 to start the development of the air bag 12. In accordance with the development of the air bag 12, the module cover 18 tears along the tear line 28, as shown in FIG. 3, and thus, the air bag 12 rapidly develops at the interior of the vehicle to protect an occupant.

In the prior art air bag device, as shown in FIG. 3, when the module cover 18 tears, it bends along an edge of the reinforcing piece 21, so that a stress is concentrated at a portion near this edge. Therefore, countermeasures are required to prevent breakage of the torn pieces of the module cover at the portion near the edge, which increases a cost of the module cover. Further, the module cover 18 is provided with the reinforcing plate 21 as well as a ridge or projection 18a for keeping a body cover (not shown), which is a member associated to a vehicle body and is disposed near the reinforcing plate 21, out of sight. This projection 18a may contact the body cover when the module cover 18 tears, in which case the module cover 18 cannot bend at an intended region.

OBJECT AND SUMMARY OF THE INVENTION

It is an object of the invention to provide an air bag device, in which a module cover can bend at an designed and intended region when it tears, and the developed air bag can surely have an intended configuration.

It is another object of the invention to provide an air bag device which can reduce or eliminate a local stress applied from an edge of a reinforcing piece.

An air bag device according to the invention, in which an air bag is attached to a retainer and is covered with a lid-like module cover having a portion near its edge, this portion being attached to the retainer, is characterized in that the portion near the edge of the module cover has a rigidity larger than that of the other portion, and the module cover has a bending region in a tearing operation, which is located near a boundary between the high rigidity portion and the low rigidity portion.

In the air bag device of the invention, the module cover surely bends at a position near the boundary between the high rigidity portion and the low rigidity portion when the inflator is activated, so that the bending region can be determined at the position intended in the design process of the air bag device.

DESCRIPTION OF THE PREFERRED EMBODIMENT

Embodiments will be described below with reference to Figures.

Figure 1:
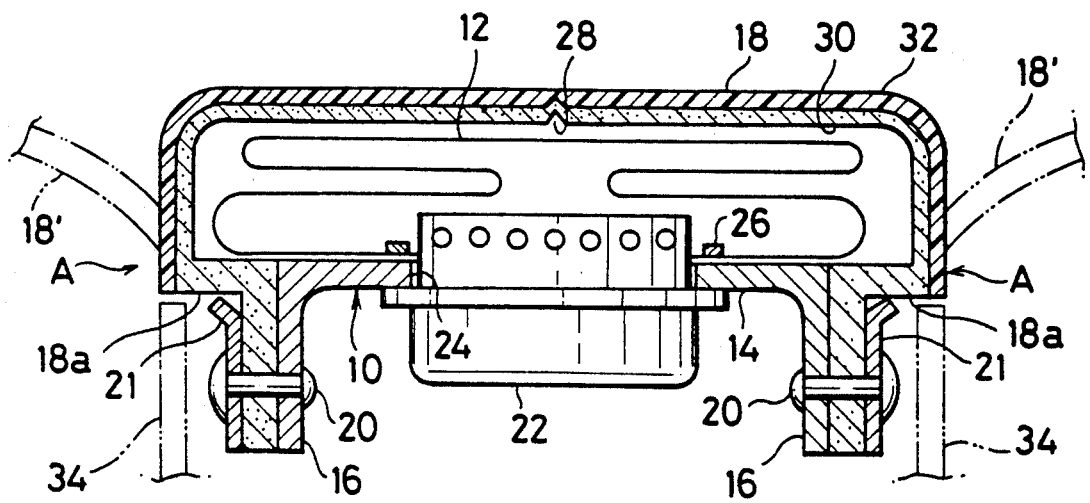
FIG. 1 is a cross section illustrating an embodiment of the invention.

FIG. 1 is a cross section illustrating a major part of a retainer in an air bag device according to an embodiment of the invention.

In the illustrated embodiment, a module cover 18 is formed in a two-color molding method, and has an inner layer 30 formed of hard resin (synthetic resin) and an outer layer 32 formed of a soft synthetic resin. This module cover 18 also has a laterally projected projection 18a. An upper surface of this projection 18a is flush with an upper surface of a flat plate portion 14 of a retainer 10.

Figure 2:
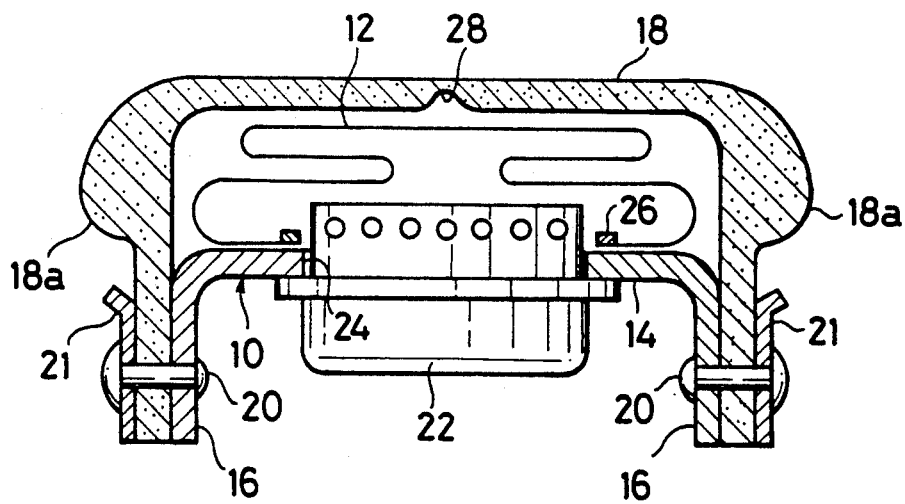
FIG. 2 is a longitudinally sectional view of an aid bag device in the prior art.
Figure 3:
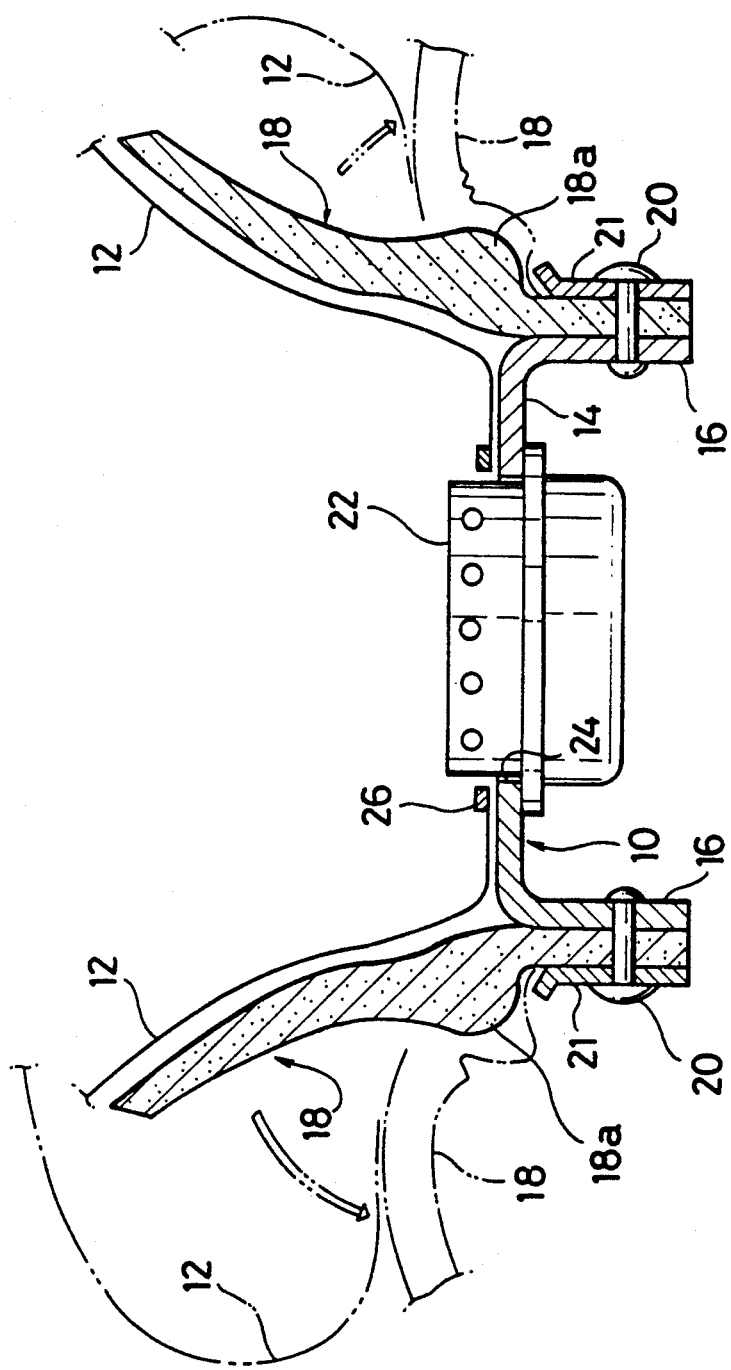
FIG. 3 is a view for illustrating operations thereof.

The inner layer 30 has a large thickness and a large rigidity at the projection 18a and a portion overlapping an erected piece 16 of the retainer 10, and has a small thickness at the portion located above them The outer layer 32 is formed on an external surface of the thin portion having the low rigidity 30. A numeral A indicates a boundary between the thick portion and the thin portion, and the inner layer 30 has the upper thin portion and the lower thick portion with this boundary A therebetween. Other structures are same as those in FIGS. 2 and 3, and same reference numerals indicate same portions.

In this air bag device, when the inflator 22 is activated to develop the air bag 12, the module cover 18 tears along a tear line 28, and the torn pieces are bent along the boundary line A between the thin portion and the thick portion, as indicated by a phantom line 18'. That is; the inner layer 30 has the projection 18a and the portion extending along the erected piece 16, which are formed of the hard resin and have the large thickness and large rigidity, so that they are not substantially deformed by a developing force of the air bag 12. Thus, the module cover 18 bends substantially at the boundary line A at which the inner layer 30 has the small thickness. Further, since the bending occurs at a position above the projection 18a, the projection 18a does not substantially deform in the bending operation of the module cover 18, and thus the projection 18a does not contact a body cover 34 disposed below it.

In this manner, bending can reliably occur at the position near the boundary line A, so that the air bag can develop to have an intended configuration. Further, a local stress is not applied to an edge of the reinforcing piece 21, which allows reduction of a strength, which is required in the module cover mounting portion for reliably preventing breakage of the torn pieces.

It should be noted that, in the invention, the thin portion of the inner layer 30 may preferably have the thickness of about 1.3 mm. The projection 18a and the thick portion extending along the erected piece 16 may preferably have the thickness which is about 1.5 to 3 times larger than that of the thin portion. Naturally, an excessive thickness increases a material cost. It also causes demerits such as an increased weight. Contrarily, an excessively small thickness deteriorates the flow of resin during the molding, and thus may often cause weld lines.

The outer layer 32 may preferably have the thickness of about 0.2 to 10 mm.

While the above description has been made with respect to the module cover formed by the two-color molding, the invention may be applied to a module cover formed of a single layer.

While the inflator is directly attached to the retainer in the above embodiment, the inflator may be attached to the retainer by means of an appropriate member.

As described above, the air bag device according to the invention can bend at the designed and intended bending region in the actual tearing operation of the module cover, and the developed air bag can reliably have the intended configuration. Further, there is an advantage that the local stress applied from the edge of the reinforcing piece can be reduced or eliminated.

What is claimed is:

1. An air bag device comprising:
   a retainer for constituting a base plate in the device and having a flat plate portion with an air bag mounting side and an erected piece extending oppositely to the air bag mounting side from a side of the flat plate portion,
   an air bag fixed to the retainer, said air bag being folded and placed above the flat plate portion,
   an inflator adapted to generate an air bag development gas and attached to the retainer, and
   a module cover for covering the air bag, said module cover being formed of a hard inner layer and a soft outer layer and having a portion near an edge of the inner layer, said portion near the edge being attached to the retainer and having a thickness and a rigidity greater than those of the other portion so that a bending region in a tearing operation of the module cover is set at a vicinity above the high rigidity portion.

2. An air bag device of claim 1, wherein said module cover includes a portion overlapping said erected piece, a projection projected laterally from this overlapping portion and a lid-like portion covering said air bag, and said bending region is located at a boundary between this projection and this lid-like portion.

3. An air bag device of claim 2, wherein said projection has an upper surface flush with an upper surface of a flat plate portion of said retainer.

4. An air bag device of claim 1, wherein said flat plate portion of said retainer is provided with an opening, and said inflator has a portion located in said opening and is fixed to said retainer.

5. An air bag device of claim 1, wherein said module cover has a tear line for tearing it.

6. An air bag device comprising:
   a retainer having a flat plate portion and an erected portion extending rearwardly from the flat plate portion,
   an air bag fixed to the retainer and placed on the flat plate portion thereof,
   an inflator attached to the flat plate portion of the retainer to open the air bag, and
   an inflator attached to the flat plate portion of the retainer to open the air bag, and
   a module cover attached to the retainer to cover the air bag, said module cover having a high rigidity portion under the flat plate portion and connected to the erected portion of the retainer, and a low rigidity portion located above the flat plate portion and the erected portion so that when the inflator is actuated, the module cover is torn and bent at a boundary between the high rigidity portion and the low rigidity portion to facilitate expansion of the air bag.

7. An air bag cover according to claim 6, wherein said high rigidity portion has a laterally extending projection flush with the flat plate portion, said module cover bending above the projection when the air bag is actuated.

* * * * *